A. NAGY.
SPRING WHEEL.
APPLICATION FILED OCT. 17, 1918.
1,324,131.
Patented Dec. 9, 1919.
2 SHEETS—SHEET 1.
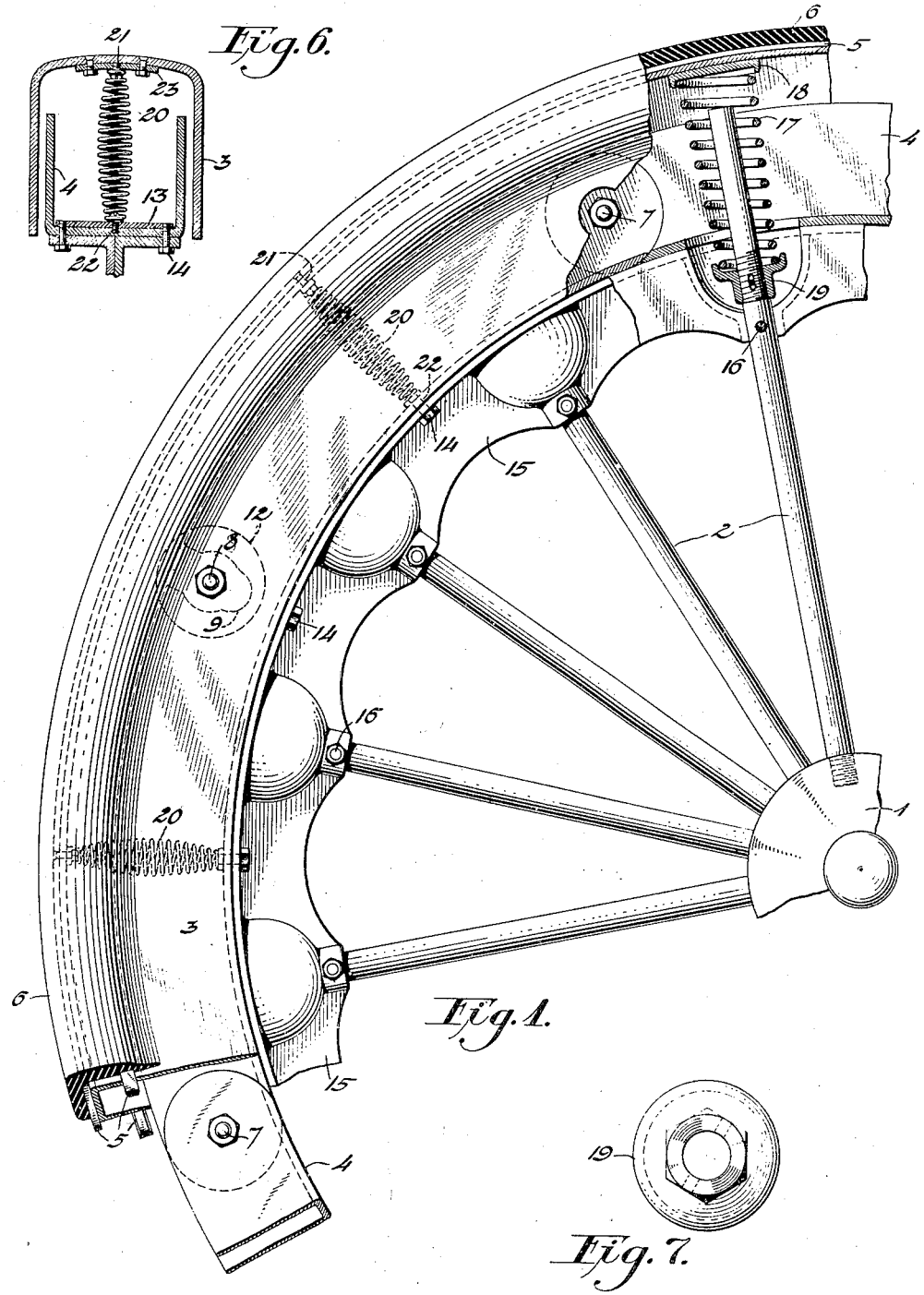
Fig. 6.
Fig. 1.
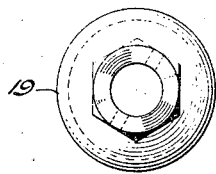
Fig. 7.
WITNESS
INVENTOR
Andrew Nagy
BY
Wm. B. Stewart
ATTORNEY A. NAGY.
SPRING WHEEL.
APPLICATION FILED OCT. 17, 1918.
1,324,131.
Patented Dec. 9, 1919.
2 SHEETS—SHEET 2.
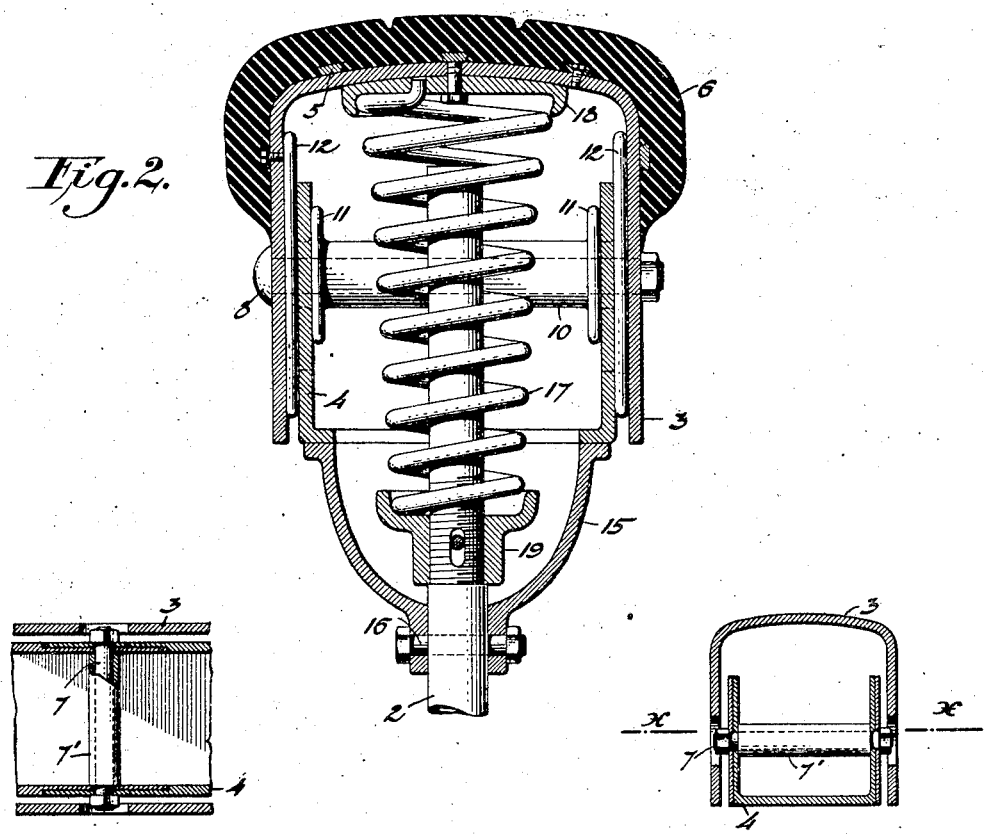
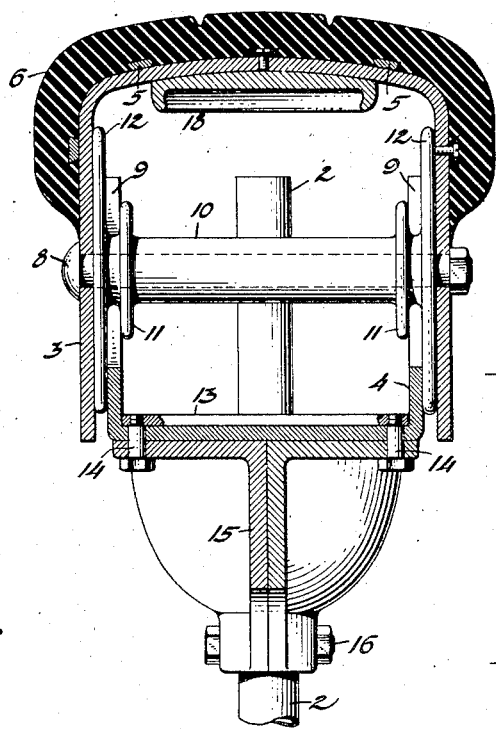
WITNESS
INVENTOR
Andrew Nagy
BY
Wm. P. Stewart
ATTORNEY

UNITED STATES PATENT OFFICE.

ANDREW NAGY, OF ELIZABETH, NEW JERSEY.

SPRING-WHEEL.

1,324,131.     Specification of Letters Patent.     Patented Dec. 9, 1919.

Application filed October 17, 1918. Serial No. 258,533.

*To all whom it may concern:*

Be it known that I, ANDREW NAGY, a subject of the Emperor of Austria-Hungary, residing at Elizabeth, county of Union, and State of New Jersey, have invented certain new and useful Improvements in Spring-Wheels, of which the following is a specification, reference being had therein to the accompanying drawings.

This invention relates to new and useful improvements in spring-wheels for vehicles and particularly for automobiles, motorcycles, etc., and has for its primary object to provide an improved spring-wheel adapted to more effectively cushion the wheel against radial stresses in a manner increasing the elasticity and durability of wheels of this character.

More specifically stated, the present invention contemplates the provision of primary cushioning means interposed directly between an outer rim of the wheel and the wheel-hub through the intermediary of the spokes only; the provision of secondary cushioning means interposed between the outer rim and an inner rim composed of a plurality of connected sections; the provision of reinforcing means between the outer and inner rims to take up lateral stresses; and to provide a wheel of this character which may be readily assembled and repaired when necessary.

Other objects of this invention will be apparent from the following description and claim which fully set forth the details of construction of the preferred embodiment of the present improvement as illustrated in the accompanying drawings, in which, Figure 1 is a fragmentary side view, partly in section, of the improved spring-wheel. Figs. 2 and 3 are transverse sectional views of the tire and rims. Fig. 4 is a fragmentary sectional view of the rims on the line *x—x* of Fig. 5, which is a sectional view of the outer and inner rims at a juncture point of the inner rim sections. Fig. 6 is a sectional view of the rims illustrating the position of the secondary cushioning means. Fig. 7 is a bottom plan view of the resistance collar.

Referring to the drawings, the improved spring-wheel is shown as formed with a hub 1 from which radiate a plurality of spokes 2 having one of their ends threaded into the hub and the free ends projecting within a double rim casing. This casing comprises an outer rim 3 and an inner rim 4, both substantially U-shaped in cross-section and arranged relatively to each other to form a housing for the cushioning means by projecting the free ends of the rims in opposite directions. The outer-rim 3 is provided with a plurality of circumferential ribs, as 5, reinforcing the tread 6, preferably of solid rubber, cast upon the outer periphery of the rim.

The inner rim 4 is formed of a plurality of sections having reduced overlapping rounded ends pivotally connected by bolts, as 7, embraced by supporting sleeves, as 7'. At intervals the outer and inner rim sections are connected in a manner permitting relative radial and slight lateral movements between the rims by bolts, as 8, passing through apertures formed in the outer rim and through centrally widened slots, as 9, formed in the inner rim. To in some manner guide the rims in their relative movements and primarily to reinforce the rims against lateral stresses, there is provided on each of the bolts 8 a sleeve 10 formed with bearing flanges 11 and 12 upon opposite sides of each member of the inner rim, slight clearance being provided to permit free movement of the rims relatively. The base of the inner rim is sustained by means of reinforcing plates, as 13 and bolts, as 14, upon a double reinforcing ring 15 united and secured upon the spokes 2 by bolts, as 16.

Primarily cushioning means for the wheel is provided in the form of coiled springs, as 17, housed within the rims and interposed between buffer-plates as 18 suitably secured to the rim 3 and resistance-collars 19 suitably secured upon the spokes 2. By means of this construction the radial stresses imposed upon the outer rim thrust directly toward the wheel-hub and are taken up by the springs 17. Secondary cushioning means are also provided in the form of coiled springs 20 interposed between the two rims 3 and 4, these springs being secured at one of their ends by means of screws as 21 upon the reinforcing plates, as 23, suitably attached to the outer rim and at their other ends by means of screws, as 22, upon the reinforcing plates 13. These springs therefore serve, as direct cushioning means and also indirectly at points diametrically opposite to the imposition of the radial stresses by tending to maintain the contour of the rims.

From the foregoing description it is apparent that the rim sections are thoroughly reinforced, that the outer rim may yield slightly to both tangential and radial stresses and is properly controlled in both directions, and that in spite of this durable construction the wheel may be readily assembled or disassembled as may be desired.

Having thus set forth the nature of the invention, what I claim herein is—

In a vehicle-wheel, the combination with a hub and spokes radiating from said hub, of relatively movable inner and outer rims together affording a housing, means for securing the inner of said rims to the spokes intermediate the ends of the latter, resistance elements provided on said spokes within and independently of said housing, and springs interposed between the outer rim and said resistance elements.

In testimony whereof, I have signed my name to this specification.

ANDREW NAGY.